April 20, 1954     J. R. TAVERNETTI     2,675,591
FILLER AND SOIL PASTEURIZER FOR NURSERY FLATS
Filed Feb. 12, 1951     2 Sheets-Sheet 1
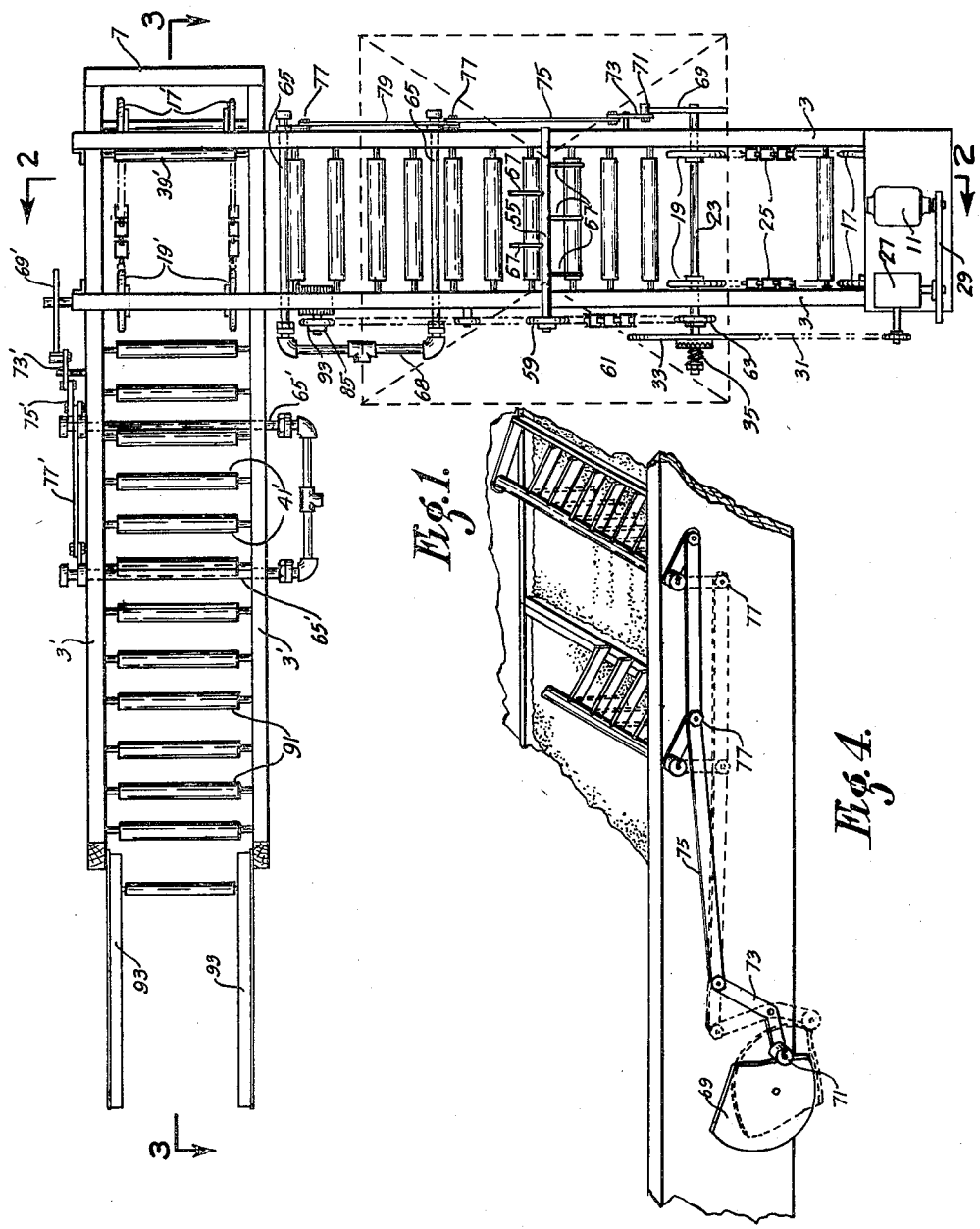
INVENTOR.
James R. Tavernetti
BY
Lippincott + Smith
ATTORNEYS April 20, 1954   J. R. TAVERNETTI   2,675,591
FILLER AND SOIL PASTEURIZER FOR NURSERY FLATS
Filed Feb. 12, 1951   2 Sheets-Sheet 2
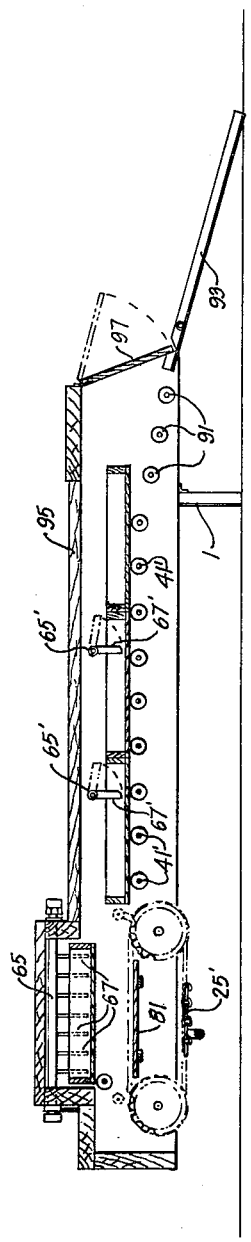
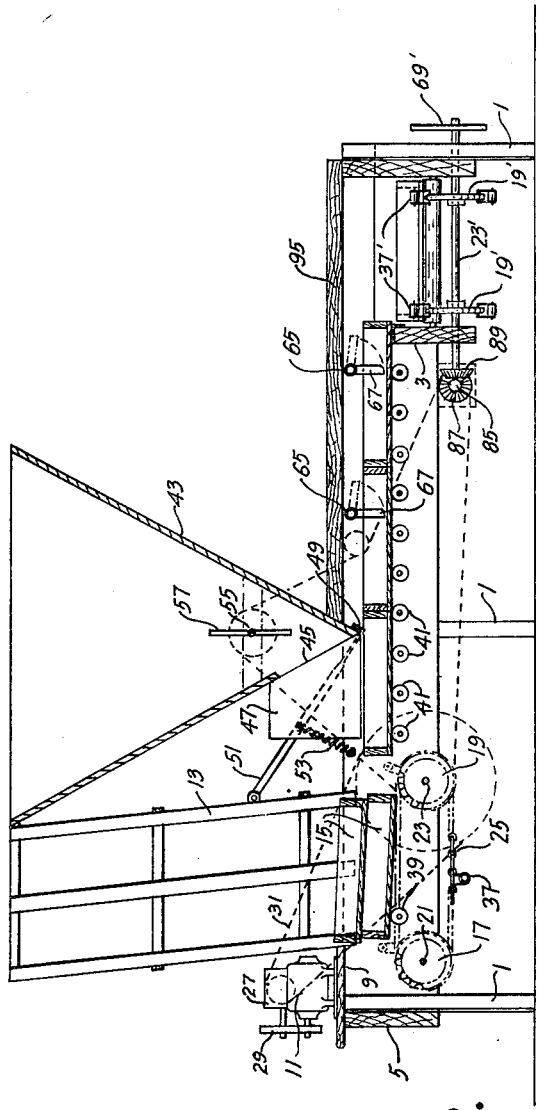
INVENTOR.
James R. Tavernetti
BY
Lippincott + Smith
ATTORNEYS Patented Apr. 20, 1954

2,675,591

UNITED STATES PATENT OFFICE 2,675,591

FILLER AND SOIL PASTEURIZER FOR NURSERY FLATS

James R. Tavernetti, Davis, Calif., assignor to The Regents of The University of California, Berkeley, Calif., a corporation of California Application February 12, 1951, Serial No. 210,577

7 Claims. (Cl. 21—80)

This invention relates to apparatus for filling nursery flats with soil and, as they are filled, pasteurizing the soil in order to kill organisms which might otherwise be harmful to the plants to be grown in such flats.

A very large proportion of all nursery stock is started in flats of the type which the apparatus of this invention is designed to operate upon. Such flats are shallow, open-topped rectangular boxes, usually but not always square. These boxes are filled with soil and planted, the plants remaining in the flats until they have reached a stage of growth suitable for replanting, either in the locality in which they are finally to be raised to maturity or in other flats where they are more widely separated than in the initial planting. In many instances the nursery stock is sold in the flats instead of as separate plants.

A large nursery is therefore required to handle many hundreds or even many thousands of such flats. The reputation of a nursery depends very largely upon the quality of the stock which it sells, including, in the term "quality," the health and vigor of growth of the stock and its freedom from weeds and parasites, either animal or vegetable.

A large nursery, selling stock in this manner, will have to supply many tons of soil in the course of a year. Even under the best of conditions, where the nursery itself controls the source from which such soil is derived, it is seldom if ever possible to assure that it does not contain harmful organisms in the form of bacteria, fungi, seeds, insects or insect eggs. A very great proportion of such harmful organisms may be killed by a pasteurization process. Such a process consists in heating the soil to a temperature somewhat below the boiling point of water, about 185° F., and maintaining it at this temperature for a period long enough to destroy the organisms.

The filling of large numbers of flats with soil, and the pasteurization of large amounts of soil, either in bulk or in the flats, have, in the past, been laborious and difficult processes and in past practice have been inefficient, particularly as far as the pasteurization is concerned.

Among the objects of this invention are, therefore, to provide apparatus for filling flats with soil and for pasteurizing the soil with which they are filled in a continuous operation, to provide a means of effecting live steam pasteurization which is economical both of steam and of labor; to provide a means of heating the entire content of the flats uniformly to the pasteurization temperature and, in general, to provide a device which will, when supplied with soil and empty flats, deliver such flats in large quantities, uniformly filled with substantially sterile soil.

Considered in general terms, the device comprises a conveyor mechanism for moving the flats along a pathway, the flats preferably being supplied from a magazine, mounted above the conveyor, from which they are pushed, one at a time, from beneath, preferably in such manner that they move forward intermittently. Also mounted above the pathway is a hopper from which the soil is fed. Above the pathway and extending transversely thereof are one or more "steam rakes," comprising manifolds which are journaled so that they can be rotated through approximately 90°, with a plurality of steam tubes or nozzles connecting with the manifolds and projecting perpendicularly therefrom to form a rake-like structure. The steam tubes are preferably flattened in the plane parallel to the movement of the flats, and are of such length as to reach substantially to the bottom of the latter and are open-ended to permit the passage of the steam. Mechanism, timed with the movement of the flats, rotates the manifolds to bring the steam tubes into a diagonal position as soon as the leading edge of each flat has passed beneath them so that the steam tubes first point diagonally into the corner formed at the leading edge of the flat. Then, as the flat continues to move forward, the steam rakes rotate into a vertical position which is retained until the trailing edge of the flat reaches the steam tubes, after which the tubes may either be lifted into a nearly horizontal position by the ends of the flats themselves, or positively rotated into such position. The cycle then repeats. Preferably more than one set of such steam rakes is used, the rake-like teeth formed by the steam tubes of the succeeding headers being positioned to fall intermediate the paths traced by those of the preceding one. Preferably the first conveyor feeds the flats onto a second conveyor mounted to progress the flats perpendicularly to the motion of the first conveyor, and this second conveyor is also provided with a timed set of steam rakes which trace paths through the soil in the flats at right angles to the paths traced by the steam rakes first described. The flats are thus supplied with steam in checkerboard fashion and all portions of the soil in them are raised to substantially the same temperature. A cover or housing is preferably provided over the entire structure from the soil hopper to the end of the second conveyor, and steam is permitted to escape into this housing during the period when the steam tubes are in their substantially horizontal position, thus raising the temperature surrounding the flats so that little heat is lost until they are finally discharged from the ends of the second conveyor.

The above will be more clearly understood from the detailed description of a preferred embodiment of the invention which follows, taken in connection with the accompanying drawings wherein:

Fig. 1 is a plan view of the preferred form of the device, the magazine which holds the empty flats being omitted in this view and the position of the hopper being merely indicated by dotted lines in order to show the conveyor structure more clearly.

Fig. 2 is a vertical sectional view of the device, including the magazine for the flats and the hopper, the plane of section being indicated by the lines 2—2 of Fig. 1.

Fig. 3 is another vertical sectional view of the device, the plane of section being indicated by the line 3—3 of Fig. 1.

Fig. 4 is an elevation of a cam mechanism suitable for rotating the steam rakes.

As shown in the drawings the device comprises an L-shaped frame mounted on supporting legs 1. The frame comprises horizontal stringers 3, spaced a somewhat greater distance apart than the width of the flats to be handled by the mechanism and forming the pathway for the first conveyor, and a second set of horizontal stringers 3' mounted on at a lower level than the first set at right angles thereto, which form the second conveyor pathway. Suitable end members 5 and 7 brace and support the stringers and complete the frame.

A platform 9 at the end of one of the arms of the L-shaped frame forms a support for a motor 11 which drives the conveyor mechanism later to be described. Immediately beyond this platform is a magazine for holding empty flats, comprising a rack 13, the horizontal dimensions of which are such as to hold loosely a stack or pile of flats 15.

The driving portion of the conveyor mechanism is mounted on the frame immediately below the magazine. This mechanism comprises two pairs of sprockets, 17 and 19, journaled on shafts 21 and 23 respectively which extend transversely of the conveyor pathway between the stringers. A sprocket chain 25 passes over each pair of sprockets, and the shafts of the latter are preferably spaced apart by a distance somewhat greater than the length of the flats and equal to the pitch circumference of the sprockets. The drive for the sprockets and chains is provided from the motor 11. In the present case this motor drives a speed reducer 27 through a V belt drive 29. From the speed reducer a sprocket chain 31 drives a sprocket 33, rotatably mounted upon the shaft 23 but connected thereto by a safety clutch 35, of known construction, which will slip in case the mechanism becomes jammed or overloaded.

The sprocket chains 25 are spaced below the open bottom of the magazine 13. The pairs of sprockets are so spaced laterally that the bottom flat of the stack will rest upon the two sprocket chains, and the latter are provided with dogs 37, spaced along the chains at intervals equal to the spacing of the sprocket shafts.

A roller 39 is mounted between the chains and slightly above the level of their upper reach to catch the trailing edge of the bottom flat as it drops from the magazine. Accordingly, as the sprockets rotate and the chains progress, one set of dogs 37 will engage the trailing edge of the flat as it rests upon the roller 39 and push it forward off of the roller until it rests entirely upon the chains.

Immediately beyond the sprocket 19 and approximately upon or a little below the level of the upper reach of the sprocket chain 25 is a series of rollers 41 extending transversely between the stringers 3. As the dogs 37 carry the bottom flat of the stack in the magazine forward they thrust it onto the rollers 41, pushing ahead of it any flats which have previously been discharged in the same fashion. As the bottom flat of the stack moves forward from under the others the next succeeding empty flat drops to take its place, the trailing edge first resting on the roller 39 until the trailing edge of the flat below it clears its leading edge, when it in turn drops down upon the sprocket chain and the operation is repeated.

As some considerable thrust is necessary to move the string of flats which rest upon the rollers 41, they remain in the position on the rollers into which they have been delivered until thrust forward by the next succeeding flat and since the dogs 37 are spaced at a greater distance than the length of the flats the movement forward along the rollers 41 is intermittent.

Immediately forward of the magazine 13 along the conveyor pathway the soil hopper 43 is mounted. At the bottom of the hopper is a discharge opening or port 45, preferably rectangular and of a width corresponding to the width of the flats. The discharge opening is in the side of the hopper facing toward the rear with respect to the motion of the flats, so as to avoid any tendency for the soil from the hopper to fall forward, and a pair of sidewings 47 extends rearwardly from either side of the opening to prevent lateral spreading of the soil.

A soil leveler, comprising a transverse bar 49 mounted on arms 51 pivoted on the magazine 13, extends across the flats just forward of the hopper. Springs 53 connecting between the arms 51 and the frame members 3 hold the leveler down against a stop so positioned that the bottom of the transverse bar 49 determines the level of the soil in the flats except at the periods when the ends of the flats are passing beneath it. At these periods the springs permit the bar to ride up over the ends of the flats. Preferably there is also provided, within the hopper, an agitator comprising a transverse shaft 55 carrying a plurality of arms 57. The agitator is continuously rotated by means of a sprocket 59 driven by a chain 61 from another sprocket 63 secured to the shaft 23.

From the foregoing it will be seen that with a stack of empty flats in the magazine 13 and with the hopper 43 filled with soil, the mechanism will deliver these flats in succession to the rollers 41, permit them to pause momentarily beneath the hopper and then move them forward, filled with soil, along the conveyor pathway beyond the hopper.

The filled flats next pass beneath the pasteurizing equipment. This comprises one or more steam rakes. Each rake is formed of a manifold 65 which is journaled in the frame transversely of the conveyor pathway. Extending from each manifold is a plurality of steam tubes 67, which are preferably flattened and are of a sufficient length to reach nearly to the bottom of the flats when in a vertical position. These tubes are open at their distal ends to permit the passage of steam, and may also, if desired, be provided with additional apertures in their walls. The first of these manifolds is positioned approximately the length of one flat beyond the hopper and the second is one flat length beyond the first. The steam tubes connecting with the two manifolds are staggered so that, viewed longitudinally of the conveyor pathway, the tubes of the second fall midway between those of the first.

Means are provided for rotating or oscillating the steam rakes in time with the motion of the flats. A cam 69 is mounted on the end of the sprocket shaft 23. A cam follower 71, mounted on the end of a bell crank 73, engages this cam, the bell crank being pivotally mounted to the frame 3. From the other arm of the bell crank a link 75 extends to a crank 77, which is secured to the manifold 65. A similar link 79 carries forward to another crank 77 on the second manifold. The cam 69 is so formed and so positioned on the shaft 23 that the steam tubes 67 may be raised to the substantially horizontal position shown in dotted lines in Fig. 2 during the passage of the ends of the flats beneath them, either being pushed up into this position by the ends of the flats or, if desired, raised into this position by a spring (not shown) which holds the cam follower against the cam. The intermission in the motion of the flats occurs at the point where the ends of the steam tubes have just cleared the leading edge of a flat. During this pause the cam rotates the manifold so that the steam tubes project diagonally toward the leading corner of the flat and then, as the flat begins to move forward again, the rotation is continued so the tubes assume the substantially vertical position shown by the solid lines, in which position they remain until the trailing end of the flats is reached and the cycle is repeated.

Upon reaching the end of the pathway of the first conveyor the filled flats drop upon a second conveyor mechanism which is, in all its essentials, similar to that which has just been described and the elements of which have therefore been designated by the same reference characters distinguished by accents. In transferring between the two conveyors the filled flats are thrust off of the rollers 41 by the succeeding flats, the right hand edge of the flat (as viewed in Fig. 1) sliding longitudinally along a transfer roller 39' until the trailing edge of the flat clears the inner edge of stringer 3'. When this occurs the flat rolls forward off of roller 39' and drops onto the sprocket chains 25'. An auxiliary platform 81 is mounted between the sprocket chains, in this instance, to take a part of the shock of the dropped flat.

Sprockets 17' and 19' may be substantially identical to the corresponding sprockets 17 and 19. The drive for the second conveyor mechanism is supplied through the sprocket chain 61 which, after passing over sprocket 59 driving the soil agitator, continues on over a sprocket 93 which is mounted on a short shaft 85 carrying a bevel gear 87. This gear meshes with a second bevel gear 89 mounted on the shaft 23' on which the sprockets 19' are secured. If square flats are used (as is most convenient) the sprocket chain 25' is the same as that of the sprocket chain 25 and the dogs 37' are positioned on the chains so that each successive flat is thrust forward onto the rollers 41' and clear of the chains 25' before the next flat drops. The second set of steam rakes comprising the manifold 65' and steam tube 67' is actuated from the cam 69' in the same manner as has already been described.

After passing under the second set of steam rakes the treated flats pass off of the horizontally alined rollers 41' to a succession of rollers 91 which forms a gradient down which the flats roll by gravity onto discharge skids or ramps 93, from which they are removed to storage or for planting.

Preferably both conveyors, from the hopper 43 to the discharge skids 93, are enclosed by a cover or housing 95. The housing is preferably closed at its output end by a swinging door or gate 97, which is hinged at its upper edge and remains closed until opened by the pressure of the discharged flat as it coasts down the incline formed by the rollers 91 onto the skids. The housing serves to retain the greater proportion of the steam which escapes from the steam rakes during their passage over the ends of the flats and helps to maintain the temperature of the soil up to the time when the flats are discharged from the device.

Steam is supplied to the steam rakes at relatively low pressure of the order of one to five pounds per square inch above atmosphere. The periods during which the rakes are out of the soil are relatively brief, very little steam escapes and practically none of the heat is wasted.

The L-shaped configuration of the device, while not necessary, is desirable in that steam is supplied to the soil in a checkerboard pattern instead of along merely parallel lines and therefore heats the soil in the flats more uniformly. The steam supplied may, if desired, be raised to some degree of superheat. Ordinarily, however, I have used saturated steam and have found that so doing enables me to raise the flats to a minimum temperature of 185° F. without difficulty and without leaving an excess of moisture in the soil. This temperature, maintained for the time required to pass the flats through the machine is sufficient to kill all insects and eggs, practically all weed seed and bacteria and many spores. Experience has shown that very satisfactory pasteurization is obtained when the speed of operation is such as to feed the flats through the apparatus at the rate of sixty per hour. Under these circumstances approximately five minutes elapse between the first injection of steam into the flats and their delivery to the discharge skids. Some slight gain in efficiency is obtained by enclosing the under as well as the upper side of the conveyors; actually, however, the continuous string of flats serves to confine the steam above them so that very little heat escapes.

I claim:

1. A filler and pasteurizer for nursery flats of substantially uniform length comprising a pathway defined by means for supporting flats on a substantially level plane while permitting movement on the flats therealong, means for intermittently advancing a series of flats along the pathway, means above said pathway for filling said flats with loose soil, a steam manifold extending transversely over said pathway and mounted for at least partial rotation about its own axis, a plurality of steam tubes of a length adapted to reach substantially to the bottom of flats disposed on said pathway connecting with said manifold and projecting therefrom to form a rake-like structure, said steam tubes being apertured to permit the emission of steam therefrom, and means operable independently of the flats in timed correlation with the intermittent movement of said flats to so rotate said manifold as to cause said steam tubes to project downwardly into the soil in said flats following the passage of the leading edge of each of said flats beneath said manifold, said manifold rotating oppositely upon the approach of the trailing edge of said flats to permit passage of the latter.

2. A filler and pasteurizer for nursery flats in accordance with claim 1 wherein the means for rotating said manifold includes means for first rotating said manifold partially to direct said steam tubes diagonally toward the corners at the lower leading edges of said flats during the intermissions of movement thereof and to continue said rotation to bring said tubes to a substantially vertical position upon resumption of the motion of said flats.

3. A filler and pasteurizer for nursery flats in accordance with claim 1 comprising a further pathway arranged substantially perpendicularly to the first-mentioned pathway defined by means for supporting flats on a substantially level plane while permitting movement of the flats therealong, means associated with the further pathway for intermittently moving flats therealong, a second manifold and steam pipes arranged with respect to said further pathway similarly to the arrangement of said first mentioned manifold and pathway, and means for transferring flats from said first mentioned to said further pathway.

4. A filler and pasteurizer for nursery flats in accordance with claim 1 wherein said means for intermittently advancing flats comprises means defining a runway, pairs of sprockets mounted on each side of said runway, a sprocket chain on each pair of sprockets, and dogs for engaging the flats secured to each of said chains, the separation of successive of said dogs being such as to provide intermittent movement of the flats whereby each flat is propelled beyond said sprockets by a succeeding flat.

5. A filler and pasteurizer for nursery flats in accordance with claim 4 wherein said manifold-rotating means comprises a cam mounted for rotation with said sprockets and timed to make one revolution in the interval between the passage of two successive dogs past a given point, a follower engaging said cam, and a linkage connecting said follower to said manifold to rotate said manifold in timed relationship with the motion of said dogs and the flats propelled thereby.

6. Apparatus for filling nursery flats of substantially uniform length with soil and pasteurizing soil in the flats, comprising in combination a driving mechanism, a pathway defined by means for supporting flats on a substantially level plane while permitting movement of the flats therealong, means operative from said mechanism for intermittently advancing a series of such flats along the pathway, means disposed adjacent the pathway for filling said flats with loose soil, a steam manifold disposed adjacent said pathway and mounted for at least partial rotation about its own axis, a plurality of steam tubes connected to receive steam from said manifold and adapted upon rotation of the manifold to extend in an extreme position into the path of the flats with the distal ends of the steam tubes occupying positions substantially corresponding to the level of the pathway, said steam tubes being apertured to permit the emission of steam therefrom, and means interconnected with said mechanism for recurrent operation in timed relation with movement of the means for intermittently advancing flats to rotate the manifold and project the steam tubes into soil contained in the flats following the passage of the leading edge of each of said flats beneath the extreme position of said steam tubes and to rotate the manifold oppositely upon the approach of the trailing edge of said flats to permit passage of the latter.

7. Apparatus in accordance with claim 6 wherein said means for intermittently advancing flats comprises means to define a loop mounted for continuous movement in endless fashion, a plurality of flat engaging dogs adapted for movement with the loop defining means, the separation of successive dogs being such as to provide intermittent motion of the flats and the overall length of the loop means being equal to an integral number of times the separation of successive dogs.

References Cited in the file of this patent

UNITED STATES PATENTS

| Number | Name | Date |
|---|---|---|
| 1,021,530 | Johnson | Mar. 26, 1912 |
| 1,350,104 | Lowe | Aug. 17, 1920 |
| 1,499,718 | Zykin | July 1, 1924 |
| 1,652,654 | Wolfinger et al. | Dec. 13, 1927 |
| 1,766,742 | Campbell | June 30, 1930 |
| 1,875,504 | Salisbury | Sept. 6, 1932 |
| 2,092,938 | Stebler | Sept. 14, 1937 |
| 2,237,345 | Frentzel et al. | Apr. 8, 1941 |
| 2,544,007 | Cook | Mar. 6, 1951 |

FOREIGN PATENTS

| Number | Country | Date |
|---|---|---|
| 209,362 | Great Britain | Jan. 10, 1924 |